W. H. WAKFER.
PERCUSSIVE HAMMER, DRILL, AND THE LIKE.
APPLICATION FILED JUNE 16, 1913.
1,119,330.
Patented Dec. 1, 1914.
2 SHEETS—SHEET 1.
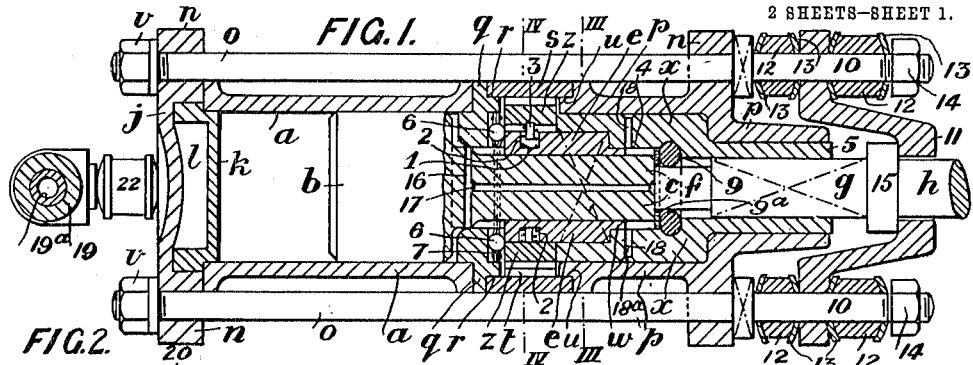
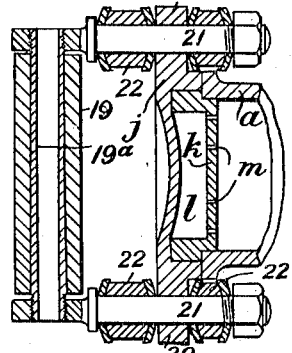
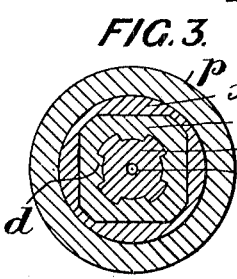
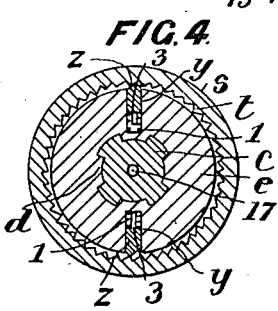
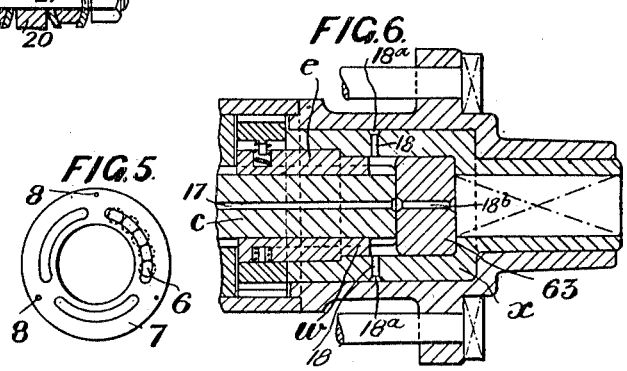
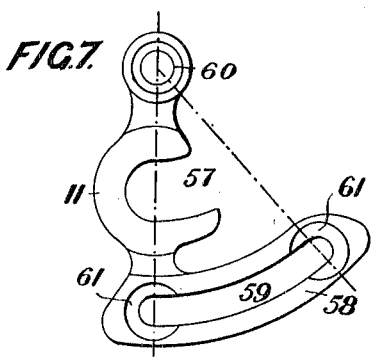
Witnesses:
B. Dommers
E. Leekert
Inventor.
William Henry Wakfer.
By Henry Ott
Atty.

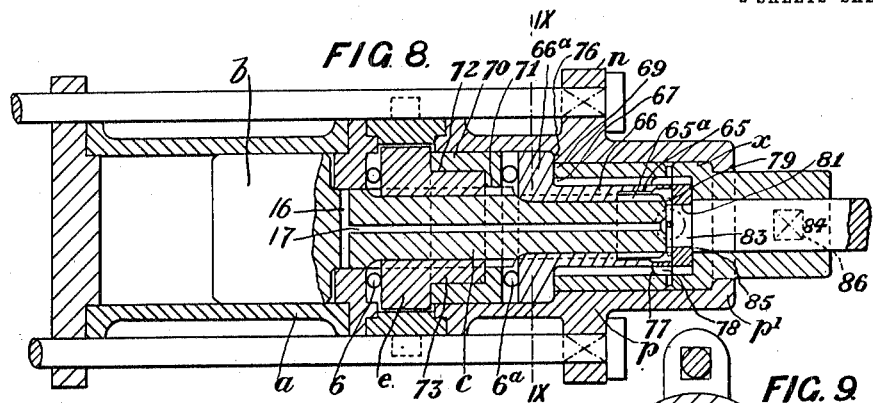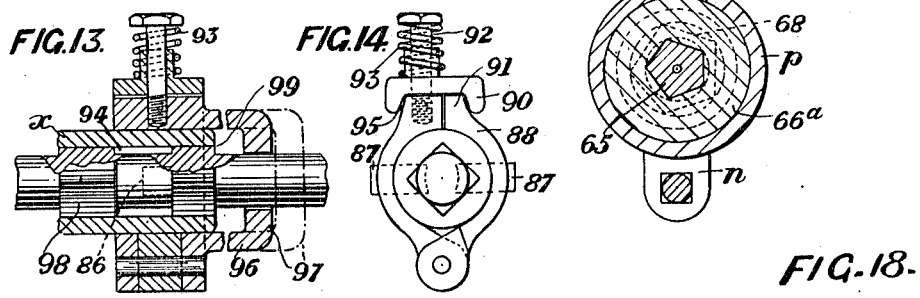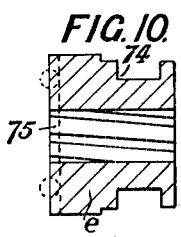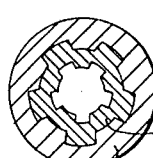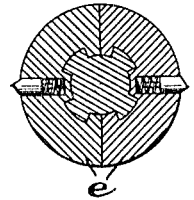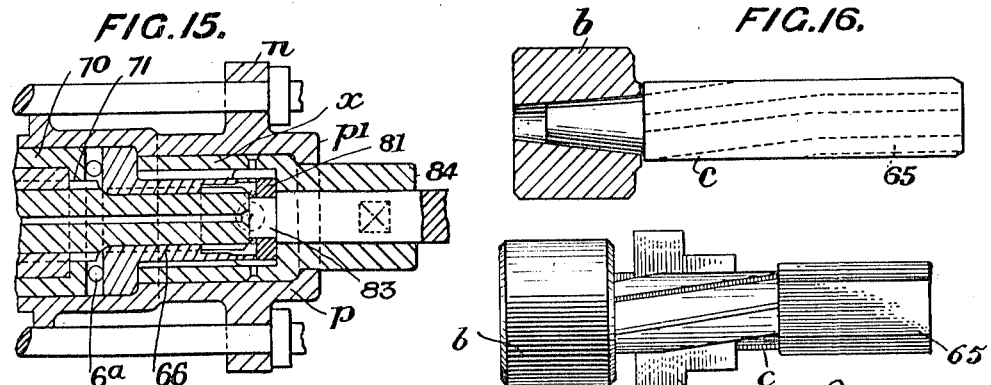

UNITED STATES PATENT OFFICE.

WILLIAM HENRY WAKFER, OF SOUTH NORWOOD, ENGLAND, ASSIGNOR OF ONE-HALF TO SAMUEL PECK, OF WALLINGTON, ENGLAND.

PERCUSSIVE HAMMER, DRILL, AND THE LIKE.

1,119,330.      Specification of Letters Patent.      Patented Dec. 1, 1914.

Application filed June 16, 1913. Serial No. 773,993.

*To all whom it may concern:*

Be it known that I, WILLIAM HENRY WAKFER, a subject of the King of Great Britain, and resident of 67 Whitworth road, South Norwood, in the county of Surrey, England, have invented new and useful Improvements in and Connected with Percussive Hammers, Drills, and the like, of which the following is a specification.

This invention relates to improvements in and connected with percussive hammers, drills and the like and chiefly concerns that type of percussive tool in which the rod portion of the piston hammer is suitably formed to coöperate with a nut device to produce rotation of the latter during the travel of the piston in one direction, the rotation being imparted to a tool-holding or chuck sleeve by means of a suitable engagement between the nut sleeve and chuck sleeve, or between the piston and chuck sleeve, and reverse rotation of the nut being prevented by means of a ratchet and pawl mechanism.

The principal objects of the present invention are to produce a simple and cheap construction of tool which shall possess a high degree of efficiency and be capable of simple adjustments for changing right-hand working to left-hand working, or vice versa.

Further objects are to facilitate the manipulation and fitting of the tool steels and to improve the tool steel stop devices.

According to this invention the nut sleeve is suitably engaged with the body of the tool by a reversible ratchet and pawl device. By simply reversing the ratchet and pawls, the chuck sleeve may be caused to turn either left handedly or right handedly during the appropriate strokes of the piston as will be hereinafter explained.

If desired, the piston rod portion may be extended and of suitable cross section for slidably and non-rotatably engaging, either a rotation sleeve which engages with the chuck sleeve, or the chuck sleeve itself.

In order to enable the invention to be readily understood, reference is made to the accompanying drawings in which:

Figure 1 is a longitudinal section of an improved percussive drill in which the piston hammer is single ended, that is to say, there is only one rod portion. Fig. 2 is a longitudinal section of the rearmost portion of the cylinder seen in Fig. 1, the section being taken in a plane at right angles to the plane of the section in Fig. 1. Fig. 3 is a section on the line III—III Fig. 1. Fig. 4 is a section on the line IV—IV, Fig. 1. Fig. 5 is an elevation of the ball race arrangements shown inserted between the front and rear covers and the front and rear nut sleeves respectively in Fig. 1. Fig. 6 is a section of the forward portion of a drill such as seen in Fig. 1, which is modified for the reception of an anvil block. Fig. 7 is an elevation, as viewed from the front end of the tool stop device seen in Fig. 1. Fig. 8 is a longitudinal section of a modified construction of drill. Fig. 9 is a cross section upon the line IX—IX of Fig. 8. Fig. 10 is a longitudinal section of a modified nut device for use in the drill seen in Fig. 8. Fig. 11 is a cross section illustrating a different form of rotation sleeve. Fig. 12 is a cross section illustrating the arrangement of a disk in the forward end of the rotation sleeve and having a central aperture for the shank of the drill. Fig. 13 is a longitudinal section and Fig. 14 is an end elevation of a clamp device carrying a tool stop and applied to the front end of a percussive tool. Fig. 15 is a view similar to Fig. 8 but showing a further slight modification and Fig. 16 is a sectional elevation of a modified form of hammer piston. Fig. 17 is a side elevation, and Fig. 18 is a cross section of another modified form of hammer piston and sleeve nut.

Referring to Figs. 1 to 4 the cylinder *a* is suitably a tubular part flanged at both ends and containing a piston *b*, provided at its front end with a rod portion *c*. This latter which may be square in section and helically twisted, or may be round in cross section and formed with helical grooves *d*, Figs. 3 and 4, projects beyond the front end of the cylinder so as to constantly engage the nut *e* which, in the example shown, would be rifled. The piston $b$ is preferably a solid block and may be plain, or it may be fitted with piston rings and springs, or with spring piston rings. The rod portion $c$ acts as a hammer head and strikes against the extremity $f$ of the shank $g$ of the tool $h$.

The rear end of the cylinder is closed by a cover $j$ which, as shown, may be formed with a circular recess for the reception of the annular flange of the end plate $k$ fitting the bore of the cylinder $a$. The space $l$ inclosed between the plate $k$ and cover $j$ may be employed as a lubricant reservoir, the plate $k$, as seen in Fig. 2, being then formed with suitable perforations $m$ through which the lubricant may be displaced, or allowed to run out, into the cylinder $a$ for lubricating the piston $b$. The rear cover $j$ is furnished with two perforated lugs $n$ to take longitudinal bolts $o$ for securing the said cover and the front head $p$ on respective ends of the cylinder, the front head $p$ being formed with similar lugs as shown.

The front end of the cylinder $a$, is closed by a ring $q$ which has a central boss portion taking into the bore of the cylinder, the outer annular portion bearing against the front flanged end of the cylinder $a$. This cover ring $q$ has a central aperture for the passage of the rod $c$ and is formed with an annular shoulder $r$ upon its outer face for supporting one end of a ratchet ring $s$ hereinafter described.

The ratchet ring $s$ is formed on its interior with ratchet teeth $t$ which do not extend from end to end of the ring so that the latter can be placed over the shoulder $r$ of the cover ring $q$ and can also receive the annular projection or shoulder $u$ on the front head $p$. Therefore, by tightening up the nuts $v$ on the bolts $o$, the front head $p$ is drawn toward the front end of the cylinder and clamps between itself and such front end the ratchet ring $s$ and cover ring $q$ aforesaid. At the same time the rear cover $j$ is forced tightly against the rear end of the cylinder $a$ and in this way the various parts enumerated are held together rigidly. The sleeve nut $e$ is mounted within the ratchet ring $s$ and front head $p$ and the forward portion of the nut $e$ is of reduced diameter, as at $w$, in order to provide a shoulder for engaging a similar shoulder in the tool rotating sleeve or chuck sleeve $x$. The enlarged or rear portion of the sleeve nut $e$ is provided with radial and preferably rectangular recesses $y$ adapted to receive similarly shaped sliding pawls $z$ which latter are forced outward by helical springs 1 seated at the bottoms of the radial recesses. Or depressions 2 may be formed in the bottoms of the recesses, as shown in Fig. 1, for seating the helical springs 1. The rectangular bodies of the pawls $z$ are provided at their outer ends with suitably shaped teeth and at their inner ends they may be formed with cylindrical shanks 3 which may be loosely inserted into the springs 1. As seen in Fig. 1, that portion of the sleeve nut $e$ between the reduced end $w$ and the enlarged rear end in which the pawls $z$ are mounted is formed approximately square in cross section and fits easily within the square shaped recess in the enlarged rear end of the rotating tool holder or chuck $x$. The intermediate portion 4 of the bore of the chuck sleeve $x$ is cylindrical to allow the forward end of the piston rod $c$ to rotate within the chuck as the rod $c$ approaches the end of its stroke. The exterior of the chuck is cylindrical and the preferably reduced front end portion 5 has a square or other angular bore for receiving the correspondingly shaped shank $g$ of the steel or tool $h$. The front head $p$ entirely surrounds the chuck sleeve $x$ and is of corresponding formation so that the shoulders, due to the step formation of the front head and chuck sleeve, engage with one another and in this way the chuck sleeve is secured against endwise movement. Thus the chuck sleeve $x$ is held against the nut sleeve $e$ and the latter is held against the cover ring $q$, a ball or antifriction bearing 6 being preferably interposed between the sleeve $e$ and ring $q$.

As shown in Figs. 1 and 5, the balls 6 may be loosely mounted in a cage comprising for example two perforated or recessed annular plates or sheet metal rings 7 which are bent or formed with similar annular grooves. The bent portions or grooves are slotted so that when the rings 7 are put together the grooves come opposite one another and act as ball races or guides and the balls project through the slots and beyond the rings and come into contact with the surface of the sleeve nut $e$ and cover ring $q$ as shown in Fig. 1. The rings 7 are suitably riveted together near the periphery as indicated at 8 in Fig. 5 and the slots may extend around a suitable arc so as to give freedom for the balls to roll.

The chuck sleeve $x$ may be formed with a shallow recess at the front end of the intermediate bore 4 and a buffer or packing ring 9, which may be protected by a steel washer, 9ª Fig. 1, is seated within the said recess. The buffer ring is adapted to receive the blow of the hammer after the latter has driven the steel $h$ forward to the position shown. The inner end $f$ of the shank $g$ is preferably made circular in cross section so that the buffer ring fits tightly around such end portion $f$ and prevents the escape of air, steam or other pressure fluid past the shank and tool.

It may now be observed that during one stroke of the piston $b$ the pawls $z$ will engage the more or less radial faces of the ratchet teeth and prevent the nut sleeve from rotating and, owing to the rifling of the nut, the piston and its rod will be forced to turn during this stroke. On the opposite stroke, however, the pawls will slip past the ratchet teeth, thereby allowing the rectilinear movement of the piston and its rod to produce a turning movement of the rifled nut $e$ which, owing to the engagement of its square portion with the chuck sleeve $x$, will cause the latter to turn and revolve the tool. Supposing that the parts arranged as shown in the drawing produce a turning of the nut sleeve and chuck during the forward stroke of the piston, should it be desired to produce reverse turning of the chuck sleeve during the rearward stroke of the piston, all that is necessary is to remove the front head $p$ and ratchet ring $s$, withdraw the pawls and re-insert them in reverse positions, turn the ratchet ring end for end and replace it in position, and finally re-apply the front head and secure the same by the bolts $o$ and nuts $v$, whereupon the apparatus will be in a condition for producing reverse revolution of the tool steel during the rearward stroke of the piston.

As shown in Fig. 1, the bolts $o$ have forward extensions 10 for the purpose of mounting a tool stop 11 which is arranged on the extensions 10 between resilient buffers or cushions 12 which may consist of rubber sleeves protected by steel or other metal washers 13. The tool stop 11 is clamped between the buffers by tightening the end nuts 14. As seen in Fig. 1, the perforated central portion of the tool stop 11 engages the collar 15 of the tool steel for the purpose of limiting the forward movement of the latter when it receives the blow of the hammer, and means will be hereinafter described for enabling the tool stop to be readily turned to an inoperative position when it is desired to remove or replace the tool steel.

The connecting transverse and longitudinal passages 16 and 17 in the piston rod $c$ are for the purpose of allowing some pressure to escape from the forward part of the cylinder to the hollow tool steel, when such is employed, so that such fluid may be delivered to the point of the drill. The radial passages 18 in the chuck sleeve $x$ are also for the purpose of allowing water or pressure fluid or both, to pass to a hollow tool steel from any suitable supply connection on the front head hereinafter described, a supply channel 18$^a$ being formed around the chuck sleeve $x$ for communicating between the passage 18 and the supply connection.

The handle 19 19$^a$ of the apparatus may be secured upon rearward extensions of the bolts $o$, or, as shown, additional lugs 20 may be provided on the rear cover $j$ and the handle may be secured thereto by short eye bolts 21. It is advantageous to arrange buffers 22 similar to those marked 12 and described in connection with the tool stop, on each side of the lugs 20, as clearly seen in Fig. 2, in order to minimize the effect of shock and vibration upon the operator. As shown in Fig. 2, the handle may consist of a tube 19$^a$ screwed into the screw threaded eyes of the bolts 21 and covered with a layer 19 of rubber, padding or anti-concussive material which is preferably a non-conductor of heat.

The tool stop 11 seen in Fig. 1 is advantageously of the construction seen in Fig. 7 according to which an opening 57 is formed in the central stop collar and one lug 58 is elongated and curved circularly and has a slot 59 which is concentric with the center of the bolt hole in the other lug 60. The lug 58 is preferably formed with slight depressions 61 at the ends of the slot 59 so that when the nut 14 is tightened the stop 11 is securely held in position. If it be required to replace or remove the tool steel which is in use, however, a blow delivered upon the free end of the lug 58 causes the latter to swing around the bolt passing through the lug 60 and the slot 57 enables the stop collar 11 to pass the tool steel $h$ Fig. 1, and to move entirely clear of the collar 15 on the steel so that the last named is free to be removed. Owing to the presence of the rubber buffers 12 it will be seen that the stop is securely held in one position or the other owing to the expansion of the buffers 12 forcing their covering washers 13 into the depression 61. Nevertheless a blow upon the lug 58 in the proper direction will cause the stop to swing, because the camming action due to the depressions 61 moving in relation to the washers 13 will compress the rubber of the buffers 12, and the expansion of the rubber will cause the washers 13 to spring into the depressions at the opposite end of the slot 59 when the stop has swung through the proper angle. Thus the nuts 14 need not necessarily be loosened for enabling the tool stop 11 to be adjusted.

When a collarless drill is used a so-called anvil block 63, Fig. 6, may be inserted within the chuck sleeve or rotation sleeve $x$. This block 63 is interposed between the hammer head or striking end of the piston rod $c$ and the shank of the tool steel and receives the blow of the hammer and transmits the same to the tool steel and for this reason is conveniently termed the anvil block. The block 63 is preferably a cylinder of hard steel fitting easily within the forward portion of the enlarged bore of the chuck sleeve $x$. The block is of larger diameter than the bore of the nut sleeve $e$ so that the forward end of the nut sleeve $e$ acts as a rear stop for the anvil block 63 while the shoulder which is formed in the chuck sleeve $x$, at the point where the enlarged bore meets the reduced angular bore adapted to receive the shank of the tool steel, acts as a front stop for the anvil block when the latter is driven forward by the hammer. Between these two stops the anvil block has a limited travel and it will be apparent that when a plain tool steel, that is to say a tool steel without a collar, is engaged in the front end of the chuck sleeve $x$ and pressed against the work, the inner end of the shank will be thrust against the anvil block 63 and will press the latter rearward against the front end of the sleeve nut $e$. Thus the latter will prevent the tool steel from being unduly pressed back into the tool.

Comparing the front head $p$ and chuck sleeve $x$ in Fig. 6 with similar parts in Fig. 1, it will be seen that in the former case the parts have been lengthened in order to accommodate the anvil block, otherwise the said parts are similarly formed, so that either a front head with a stop collar 11 as shown in Fig. 1 may be employed, or a longer front head and chuck sleeve $x$ containing an anvil block may be substituted therefor on the same tool.

In some tools the rotation nut sleeve $e$ is screwed into the chuck sleeve $x$ and in such cases it would be necessary to unscrew the nut sleeve $e$ from the chuck sleeve in order to have access to the anvil block 63. For this reason an arrangement such as is illustrated is preferred, namely one in which the rear end of the chuck sleeve simply takes over an angular portion of the nut sleeve, and the latter has a forward cylindrical extension $w$ which enters the bore of the chuck sleeve.

The chuck sleeve may be made in two parts if desired and the bore in each part may be shouldered in order to limit the movement of the anvil block in both directions.

The anvil block preferably has its edges rounded off as shown so that it does no damage to the parts against which it strikes, and if air or steam or water is to be fed to the hollow tool steel by either of the ducts 16, 17 or 18, 18$^a$ hereinbefore described, the block 63 is formed with a central bore 18$^b$ for example as shown in Fig. 6.

A number of interchangeable chuck sleeves $x$ may be held in reserve adapted to engage with steel shanks of various cross sections so that one sleeve may be substituted for another when one steel is to be substituted by a new steel having a different kind of shank.

According to the modification seen in Figs. 8 and 9, the nut $e$ aforesaid is not engaged with the tool-holding sleeve $x$ to impart rotation to the latter, but an extended portion 65 of the piston rod $c$ is used for the purpose and is suitably formed, as for example, by providing it with straight ribs or flutings 65$^a$ Fig. 8, or by forming it of angular cross section Fig. 9, so as to non-rotatably but slidably engage a rotation sleeve 66 formed with a corresponding bore, which sleeve 66 brings about the rotation of the tool as hereinafter described. The extension 65 of the rod $c$ is conveniently of smaller diameter than the rod $c$ itself, but it may be of the same diameter or of even larger diameter, if desired. The rotation sleeve 66 which engages the extension may be a part of the tool holding sleeve $x$ itself or it may, as shown, be an intermediate sleeve, having a bore corresponding to the cross section of the rod extension 65, and having a ribbed or fluted exterior as indicated at 67 Fig. 8, or an angular exterior, as indicated by dotted lines at 68, Fig. 9, for engaging the correspondingly shaped bore of the inner or socket portion 69 of the tool-holding sleeve or chuck $x$.

It is advantageous to arrange a ball bearing 6 between the front cover ring of the cylinder and rear end of the nut $e$ and a second ball bearing 6$^a$ between the front end of the nut $e$ and the rear end of the rotation sleeve 66 which rear end is suitably enlarged as indicated at 66$^a$.

The nut $e$ need not extend forwardly as far as the rear end 66$^a$ of the rotation sleeve 66 but, if desired, a tubular distance piece 70 may be inserted between the nut $e$ and sleeve 66 and this piece may have a small bore 71 at its forward end fitting easily over the piston rod $c$ or over the ribs or worms thereon and an enlarged bore 72 at its rear end fitting over and, if desired, non-rotatably engaging the reduced forward end 73 of the nut $e$. In this case the forward ball bearing 6$^a$ would be arranged as shown between the tubular piece 70 and the rotation sleeve 66. If the nut $e$ itself extends forwardly to the ball bearing 6$^a$, however, the same may be of considerably reduced diameter, as at 74 in Fig. 10, between its pawl-carrying portion and its forward end in order to reduce the weight.

When the rod extension 65 is made of larger diameter than the piston rod $c$, itself, the nut $e$ may be made in halves as shown in Figs. 17 and 18 or divided into a suitable number of sections by dividing the nut in a plane or planes containing the longitudinal axis, as otherwise, of course, the enlarged extension could not be passed through the nut $e$. Also, and if desired, the length of the nut proper may be reduced, and at the ends thereof there may be ball race cups or rings indicated by dotted lines 75 in Fig. 10, of a thickness corresponding with the reduction in length and such an arrangement would be applicable with great advantage in the case of a nut divided into parts as aforesaid. If desired and as shown in Fig. 16, the piston rod comprising the portions $c$ and 65 may be formed with a tapered end fitting into a corresponding bore or recess in the piston $b$. With such an arrangement the rod may be removed from the piston and the nut engaged with or disengaged from the portion $c$ from the rear end.

The rear end of the front head $p$ is preferably of larger internal diameter than the front end, to receive the forward end of the nut $e$ Fig. 10, or nut $e$ and sleeve 70, Fig. 8, and to receive also the enlarged rear end $66^a$ of the rotation sleeve 66 which thereby shoulders against the annular surface formed at 76 in the front head at the junction of the bores of different diameters and a portion of the shock is thus taken at this place or shoulder. The rear portion of the tool holding sleeve $x$ fits within the smaller bore of the front head $p$ and over the forward portion of the rotation sleeve 66 which is sufficiently reduced in diameter so as to allow the rear portion of the tool-holding sleeve to be of a convenient thickness. The tool-holding sleeve $x$ has a forward portion of reduced external diameter so as to shoulder against a flange or annular projection $p^1$ on the orifice of the front-head, this forward portion having a suitable bore for receiving and engaging with the shank of a tool steel. The sleeve $x$ and 66 may if desired be made in one piece.

The enlarged bore at the rear of the tool steel-holding sleeve or chuck $x$ need not be fluted or formed angularly along the whole of the length but it is sufficient if the flutings or facets extend only a part of the distance from the rear end toward the forward end of the enlarged bore and terminate at say the point 77, so that between the termination 77 of the flutings or facets and the said forward end there is a clearance 78 which is convenient when pressure fluids or water are to be introduced at the front head $p$. The forward end of the bore of the rotation sleeve 66 may be enlarged as at 79 and perforated or formed with apertures and, at the extremity, an annular recess 80 may be formed to receive a rubber buffer ring. The enlargement of the bore and the perforations facilitate the introduction of fluids or water to the hollow tool when this is required and the buffer ring when used, in addition to absorbing shock, prevents the loss of motive fluid.

Within the forward end of the enlarged bore of the steel-holding sleeve there may be a perforated disk 81, see also Fig. 12, having a central aperture 82 corresponding in shape with the shape of the reduced extremity 83 of the shank 84 of the tool steel. This reduced extremity protrudes through the disk into the path of the hammer 65 and is stopped in its inward movement by the shoulder 85, which is formed at the junction between the reduced extremity 83 and the shank 84, abutting against the outer face of the disk 81, the disk being prevented from moving inwardly of the tool by the rotation sleeve 66. Thus a collarless steel can be employed without resorting to an anvil block. However, if desired, the disk 81 can be dispensed with and the parts may be suitably arranged for the reception and use of an anvil block as hereinbefore described. In order to still further obviate the use of collars on drill steels, suitable radial projections may be arranged in the tool chuck or sleeve in such a position as to take into suitable recesses or grooves in the shank of the steel, the said recesses or grooves permitting of the short reciprocatory movements of the shank within the chuck. Thus the chuck or steel-holding sleeve $x$ may be formed with diametrically opposed openings or perforations 86 adapted to receive check studs or dogs 87, Figs. 13 and 14, which dogs are preferably inserted from the exterior and extend through the walls of the chuck or steel holder $x$. The outer portions of these check studs or dogs 87 are in one with, or secured to, a suitable clamp or holder fastened around the chuck or steel holder. For example a ring-shaped clamp in two hinged portions 88, 89, each portion having a suitable check stud or dog 87, may be applied around the chuck or steel holder $x$ in a position for the check studs or dogs 87 to engage with the diametrically opposed openings 86 in the chuck or steel holder $x$ and, when closed, this hinged ring or clamp 88, 89, may be fastened on the chuck $x$ by means of a bridge piece or cap 90 engaging, or taking over, lugs or projections 91 on the adjacent extremities of the hingedly connected ring portions 88, 89. The bridge piece or cap 90 may be permanently mounted on a stud 92 on one of the lugs aforesaid and may be retractable against the action of a spring 93 on the stud. The ring clamp 88, 89, is therefore, readily unfastened or fastened by retracting the bridge piece or cap 90 and disengaging the same from, or engaging it with, the juxtaposed lugs or extremities 91 of the ring portions 88, 89. The inner ends of the check studs or dogs engage a suitable recess 94 formed in the square or angular shank 98 of the steel. If a collared steel is to be used, the check studs or dogs 87 may be removed from the ring clamp and substituted by shorter dogs which will not project inwardly beyond the walls of the sleeve, but will serve merely for retaining the ring clamp in position when threshed by the collars of the steel as hereinafter described. A suitable recess may be provided in the shank of a collared steel so that the same check studs or dogs may serve both for collared and collarless steels. Of course any suitable means can be employed for fastening the ring clamp but the spring pressed cap device is very convenient and, if the engaging surfaces of the cap and the lugs be formed with suitable inclines as at 95, the spring action will tend to cause the cap 90 to tighten the clamp, upon engagement of the parts.

It may be advantageous to form or provide on the ring clamp an arm or projection 96 carrying a stop collar 97 at a suitable distance beyond the end of the chuck $x$. In this way the ring clamp would be furnished with a device adapted to engage a stop collar on a tool steel, in addition to the devices adapted to engage recesses in a collarless tool steel, so that either type of tool steel could be used with the same appliances. When a collared steel is used, the collar could thresh the stop 97 but the clamp 88, 89 would be held on by the dogs as aforesaid. The dogs aforesaid when removably fitted are preferably tapered so as to prevent their escape outwardly through the ring clamp. In cases where a drill steel may be formed with an enlarged square shank 98 it may be arranged for the stop 97 to engage the shoulders 99 formed at the junction of the round steel with the square or angular shank for the purpose of limiting the outward stroke of the steel. The dotted position of the collar 97 is the position which it would have when a collared shank is used.

The lugs $n$ on the front head seen in Fig. 8 may be positioned forwardly as shown in Fig. 15 so as to serve for mounting a tool stop device of the character described with reference to Fig. 7 as will be readily understood.

It will be understood that the helical devices or helical formations for the piston rod portions hereinbefore referred to may take any of the known forms as for example, helical ribs, or grooves, or faces on a rod of circular cross section, or rods of angular cross section formed with a twist, or otherwise suitably formed for producing rotation. Likewise the rod portions which are formed with axially directed devices merely for preventing relative rotation while allowing of sliding engagement between such rod portions and their respective sleeves may be formed with straight flutings or ribs or straight faces or sides or otherwise suitably formed to produce a rectilinear guiding engagement.

I claim:—

1. A percussive hammer, drill, or like tool comprising in combination a piston having a rod formed with helical grooves or the equivalent, a rotation nut adapted to coöperate with the rod, a tool-holding or chuck sleeve adapted to be rotated by the coöperation of said nut and rod, and a reversible ratchet and pawl mechanism adapted to be readily reversed in relation to the nut and to hold the nut against rotation in one direction or the other according to the disposition of the parts of such mechanism.

2. A percussive hammer, drill, or like tool comprising in combination a coöperative piston and rotation nut the nut or the piston being in driving engagement with a chuck or tool-holding sleeve and the nut being formed with recesses adapted to receive pawls which can be reversed in said recesses, and a ratchet ring adapted to coöperate with the pawls the said ring being reversibly mounted on the body of the tool.

3. A percussive hammer, drill, or like tool, comprising a rotation nut and chuck combined with a ratchet and pawl mechanism reversible in relation to the nut, a cylinder, a head and a cover on the front end of the cylinder and having shoulders formed thereon, said ratchet consisting of an internally toothed ring adapted to be mounted with either end toward the front of the cylinder on said shoulders.

4. In a percussive hammer, drill or like tool comprising a rotation nut and chuck, combined with a reversible ratchet and pawl mechanism, the assemblage of parts for constituting the tool comprising a rear cover, cylinder body, front cover, reversible ratchet ring, and front head all rigidly clamped together by longitudinal bolts, said ratchet being engaged by pawls reversibly mounted in said nut, substantially as described.

5. A percussive hammer, drill or like tool comprising in combination a piston rod formed with helical devices, a rotation nut adapted to coöperate with the devices on said rod said nut being radially recessed at one end and formed of non-circular cross section at the opposite end, pawls reversibly arranged in said recesses, a socket tool chuck adapted to be rotated by said nut, and a reversible ratchet ring for engaging said pawls substantially as set forth.

6. In a percussive tool in which the piston rod coöperates with a rotation nut and has a sliding and non-rotatable engagement with a chuck sleeve, and a ratchet and pawl mechanism coöperates with the nut, the provision of ball bearings between the nut and the chuck sleeve substantially as described.

7. In a percussive tool in which the piston rod coöperates with a rotation nut and has a sliding and non-rotatable engagement with a chuck sleeve, and a ratchet and pawl mechanism coöperates with the nut, the construction of the nut in two or more segments substantially as and for the purpose described.

8. In a percussive tool in which the piston rod coöperates with a rotation nut and has a sliding and non-rotatable engagement with a chuck sleeve, and a ratchet and pawl mechanism coöperates with the nut, the arrangement according to which the piston rod is disconnectible from the piston substantially as described.

9. In a percussive tool in which the piston rod has a portion coöperating with a rotation nut and another portion slidably and non-rotatably engaging a chuck sleeve, and a ratchet and pawl mechanism coöperates with the nut, the construction according to which a tapered end of the rod is inserted into a corresponding hole in the piston substantially as described.

WILLIAM HENRY WAKFER.

Witnesses:
W. MORBEY,
H. D. JAMESON.